M. FLATHER.
FRICTION FEED MECHANISM.
APPLICATION FILED MAY 6, 1904.

950,480.

Patented Mar. 1, 1910.

WITNESSES
A. T. Palmer
H. M. Kelso

INVENTOR
Mark Flather
by Richard P. Elliott
his Attorney

UNITED STATES PATENT OFFICE.

MARK FLATHER, OF NASHUA, NEW HAMPSHIRE.

FRICTION FEED MECHANISM.

950,480.  Specification of Letters Patent.   Patented Mar. 1, 1910.

Application filed May 6, 1904. Serial No. 206,769.

*To all whom it may concern:*

Be it known that I, MARK FLATHER, a citizen of the United States, residing at Nashua, county of Hillsboro, and State of New Hampshire, have invented certain new and useful Improvements in Friction Feed Mechanism, of which the following is a specification, reference being had to the accompanying drawings.

The object of my device is to provide in a friction feed mechanism means whereby pressure on the contacting surfaces of the friction device may be relieved or removed automatically when the desired throw of the feeding device has been completed.

Another object of my invention is to so construct and arrange my feed device that it may be applied to various iron and wood working tools in which either the work or the cutting tool has a reciprocating motion, such as metal planers and shaping machines.

Figure 1:
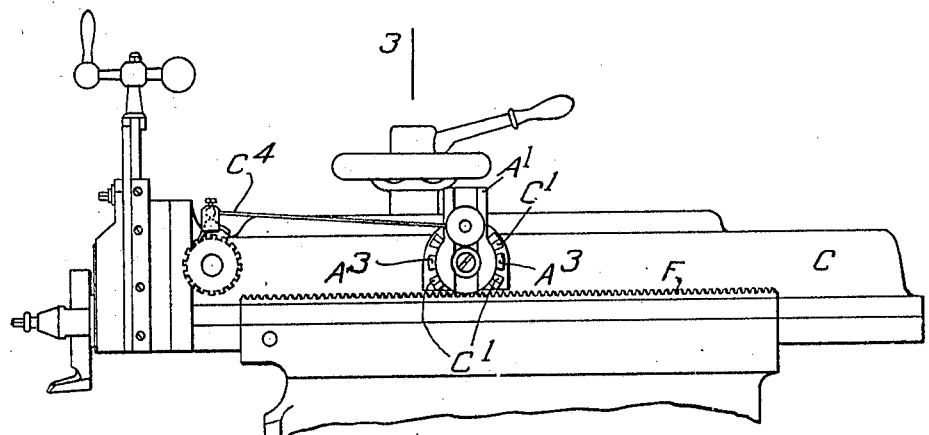
Figure 4:
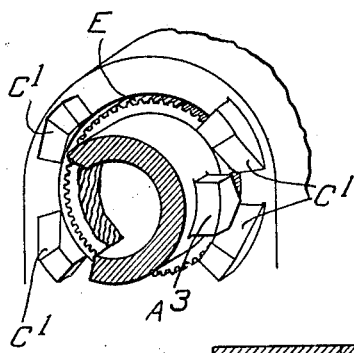
Figure 3:
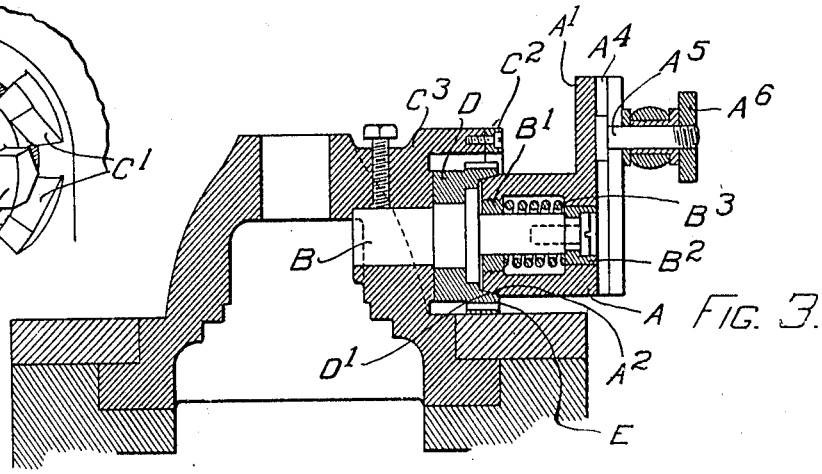
Figure 2:
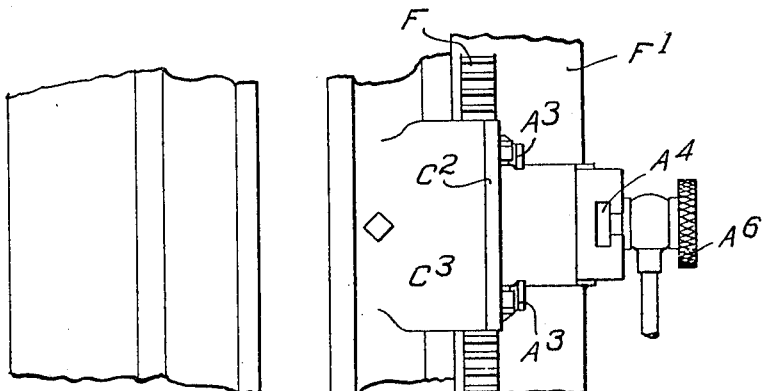

In the drawings accompanying this specification—Figure 1 represents a side elevation of a portion of a shaping machine having my friction feed device attached thereto. Fig. 2 is a plan view of a portion of a section of the shaping machine to which my improved friction feed mechanism is attached. Fig. 3 is a sectional elevation through line 3—3, Fig. 1. Fig. 4 is a perspective sectional view of a portion of the friction mechanism, and the means for relieving the pressure between the frictional surfaces thereof.

In the drawings, A represents the reciprocating member of my friction feed device; it is mounted upon the stud B secured in the ram C of a shaper. Surrounding the stud B is the collars B' and B², which serve as a bearing for the reciprocating member A. The collar B' is screw-threaded in the inner end of the oscillating member A, and may be screwed in or out to adjust the friction on the surfaces of the friction members A² and D', and the collar B² is a revolving fit therein. Surrounding the stud B is a spiral spring B³, its inner end bearing against the collar B', while its outer end has a bearing against the collar B², the purpose of the spiral spring being to press said reciprocating member A inwardly against the rotary friction member D, so that the surfaces A² and D' will come into frictional contact in order to oscillate said reciprocating member A.

The rotary friction member D is adapted to rotate about the stud B and has on its periphery the gear teeth E, which enmesh with the rack F attached to the gib F'. It will be understood that the ram C is adapted to slide back and forth longitudinally by any suitable means. When said ram C slides backward and forward it causes the friction member D to rotate by reason of the gear teeth thereon enmeshing with the stationary rack F.

A³, A³ are cam surfaces attached to the reciprocating member A, and C', C', C', C' are cam surfaces formed upon the plate C² which is attached to the projection C³ of the ram C in such manner that said cams C', C', C', C' are in the track of the cam projections A³, A³, and adapted to contact with same to throw the reciprocating member A outwardly and relieve the tapering frictional surfaces A² and D' from frictional contact. The relieving or throwing of the tapering frictional surfaces D' out of frictional contact allows the rotating member D to rotate freely about the stud B without moving the oscillating member A.

In the embodiment of my invention as attached to a shaping machine, the member A has the portion A' attached to its outer end, which is provided with the slot A⁴ adapted to receive the stud A⁵. Said stud A⁵ has pivoted to it one end of the connection rod C⁴, the other end of said connection rod C⁴ being attached to any suitable device for feeding the tool-head of the shaping machine, the movement of the pitman rod C⁴ being greater or less, according as the connection A⁵ is moved out or in from the center of the reciprocating member A. When the feeding device is adjusted to the proper throw, it is held in position by means of the screw-threaded clamping nut A⁶.

The operation of my improved device is as follows:—

The desired amount of feed of the cutting tool being determined, the end of the connection rod C⁴ which is secured to the reciprocating member A is moved up or down in the slot A⁴ to give it the right amount of movement. The shaper being started up so that the ram C slides back and forth, the portion A will revolve through the medium of the gear teeth on the portion D enmeshing with the rack F, and will continue to revolve until the cam projections A³, A³ strike either of the cams C', C', C', C'; thereupon said cam surfaces will ride upon each other and throw the frictional surfaces A² and D' out of contact, whereupon said portion A will remain stationary until the ram C has completed its stroke and started on the return movement.

Having described my invention, what I claim is:—

The combination in a friction feed mechanism for planers of a reciprocating ram having a stud secured therein; a revoluble tapering friction member on said stud; gear teeth on said friction member; a stationary rack secured to the frame of the planing machine arranged to enmesh with the teeth of said gear; a reciprocable friction member mounted on said stud and arranged to engage the revoluble friction member; a spring for causing the engagement of said friction members; an adjustable collar for adjusting the tension of said spring; oppositely disposed cam members on the reciprocating friction member; oppositely disposed stationary cam members arranged for engaging the cam members on the friction member; and adjustable means secured to said reciprocating friction member to connect it with the feed mechanism of a planer, substantially as shown and described.

In testimony whereof, I have hereunto set my hand, in the presence of two subscribing witnesses, this the 30th day of April, A. D. 1904.

MARK FLATHER.

Witnesses:
J. E. TOLLES,
C. A. WOODBURY.